United States Patent [19]

Pinsley

[11] 4,206,429
[45] Jun. 3, 1980

[54] GAS DYNAMIC MIXING LASER

[75] Inventor: Edward A. Pinsley, North Palm Beach, Fla.

[73] Assignee: United Technologies Corporation, Hartford, Conn.

[21] Appl. No.: 836,120

[22] Filed: Sep. 23, 1977

[51] Int. Cl.² .................... H01S 3/095; H01S 3/223
[52] U.S. Cl. ........................ 331/94.5 P; 331/94.5 G
[58] Field of Search ................ 331/94.5 P, 94.5 G, 331/94.5 PE

[56] References Cited

U.S. PATENT DOCUMENTS

| | | | |
|---|---|---|---|
| 3,571,747 | 3/1971 | Bronfin | 331/94.5 G |
| 3,614,656 | 10/1971 | Pinsley | 331/94.5 G |
| 3,641,457 | 2/1972 | Brown | 331/94.5 G |
| 3,648,194 | 3/1972 | Melikian | 331/94.5 G |
| 3,668,549 | 6/1972 | Biancardi | 331/94.5 |
| 3,688,215 | 8/1972 | Spencer | 331/94.5 |
| 3,760,294 | 9/1973 | Roberts | 331/94.5 P |
| 3,866,477 | 5/1975 | Rubs | 331/94.5 |
| 3,886,475 | 5/1975 | Pinsley | 331/94.5 |
| 3,984,784 | 10/1976 | Pinsley | 331/94.5 |
| 4,002,431 | 1/1977 | Lewis | 23/284 |

OTHER PUBLICATIONS

Proc. IEEE, vol. 61, pp. 414–422, Apr., 1973.
IEEE Spectrum, Nov. 1970, vol. 7, pp. 51–58.

*Primary Examiner*—William D. Larkins
*Attorney, Agent, or Firm*—Lawrence A. Cavanaugh

[57] ABSTRACT

A high power gas dynamic mixing laser capable of having an energizing gas formed by an exothermic decomposition process is disclosed. The laser includes a housing having a reaction chamber in which an excitation gas is formed by thermal decomposition of a starting material, a nozzle connected to the housing for expanding the excitation gas to supersonic velocity, means for injecting a lasing gas into the supersonic stream of excitation gas to produce an inversion of populated energy levels of the lasing gas, optical means for extracting a laser beam and exhaust means for passing the gas mixture to the atmosphere. An embodiment of the present invention includes a return duct attached at one end to the exhaust means and at the other end to the housing for circulating the gas through the laser and a lasing gas capable of thermal decomposition downstream the optical means to form the excitation gas.

6 Claims, 4 Drawing Figures

GAS DYNAMIC MIXING LASER

BACKGROUND OF THE INVENTION

1. Field of the Invention

This invention relates to gas dynamic mixing lasers and more particularly to a flowing gas laser in which an energizing gas is formed by an exothermic thermal decomposition process.

2. Description of the Prior Art

The well known gas dynamic mixing laser principle involves the rapid adiabatic expansion of a high temperature energizing gas, typically nitrogen, through an array of supersonic nozzles, mixing the energizing gas with a relatively cool lasing gas, typically carbon dioxide, in a supersonic expansion region of the nozzle and extracting laser power from the lasing gas as it passes through an optical cavity downstream of the supersonic expansion region.

A gas dynamic mixing laser is disclosed by Bronfin et al in U.S. Pat. No. 3,571,747 on "Gas Injection Laser" filed Feb. 23, 1968 and held with the present application by a common assignee, in which an energizing gas, such as nitrogen, is heated by external means and expanded through a supersonic nozzle array to create a vibrationally excited stream of gas molecules. The stream is then mixed with a relatively cool lasing gas, such as carbon dioxide, producing a population inversion of the energy levels of the lasing gas. The gas mixture than passes through an optical resonator where laser power is extracted.

Apparatus for producing a high temperature gas such as nitrogen from the thermal decomposition of a substance such as nitrous oxide is disclosed by Lewis in U.S. Pat. No. 4,002,431 filed Dec. 19, 1975 and held with the present application by a common assignee, in which liquid nitrous oxide is converted at least partially to a gaseous state as it is passed through an injector system into a decomposition chamber. The decomposition is initiated and/or maintained by an ignitor, preferably a hydrogen-oxygen device, and the heat of decomposition sustains the reaction to produce nitrogen gas having a high temperature.

Close cycle gas dynamic laser systems as disclosed by Pinsley in U.S. Pat. No. 3,886,475 filed Feb. 21, 1973 and held with the present application by a common assignee, are characterized by the recycling of the gas mixture which passes through the optical resonator. However, the efficient closed cycle operation of a gas dynamic mixing laser requires that the lasing gas be separated from the recycled energizing gas. Meliklan et al U.S. Pat. No. 3,648,194 on "Semiclosed Cycle Gas Laser System" filed Sept. 10, 1969 and held with the present application by a common assignee discloses a system in which a lasing gas such as carbon dioxide is removed from the effluent of a flowing gas laser of the mixing type of an absorptive apparatus, such as a lithium oxide or lithium hydroxide solid absorbent bed, and the remaining gases are recycled through the laser. Fresh lasing gas is injected into the system at the supersonic nozzle array from a pressurized external source. The lasing gas is removed from the gas effluent to permit recycling of the energizing gas.

A major disadvantage of the present gas dynamic mixing lasers is the need for a separate source of energy to heat the energizing gas to an elevated temperature. Excitation of the energizing gas has been accomplished utilizing electrical energy, thermal energy from a heat exchange process, and combustion processes. However, electrical excitation reduces portability, the heat exchanger is temperature limited and inefficient, and the combustion process produces undesirable chemical compositions. Furthermore, as described above, prior art closed cycle gas dynamic mixing lasers have a second major disadvantage in that they require that the lasing gas be separated from the recycling mixture. This requires introducing gas separation apparatus into the system resulting in reduced specific power of the laser.

SUMMARY OF THE INVENTION

A primary object of the present invention is to provide a high power gas dynamic mixing laser capable of having an energizing gas formed by an exothermic decomposition process.

According to a preferred embodiment of the present invention, a gas dynamic mixing laser is provided comprising: a housing having a reaction chamber in which a first gas can be produced by thermal decomposition of a starting material, a containment means for the starting material connected to the housing, means for initiating decomposition of the starting material within the housing to form the first gas, a nozzle connected to the housing to expand the first gas to supersonic velocity, containment means for a second gas, a chamber including optical means located downstream from the nozzle, means attached between the optical means and the housing for passing the second gas into the chamber, and means for exhausting the gases from the chamber. In one embodiment of the present invention a gas dynamic mixing laser is provided comprising: a housing having an entrance and an exit, a nozzle connected to the exit of the housing to expand a first gas to supersonic velocity, containment means for a second gas, a chamber including optical means located downstream the nozzle, means attached between the optical means and the housing for passing the second gas into the chamber, means located downstream the chamber for producing a stagnation temperature sufficiently high to thermally decompose the second gas to form the first gas, a duct connected at one end to the means for producing a high stagnation temperature and at the other end to the entrance to the housing to provide a passage for recycling the first gas, bleed means located within the duct, a heat exchanger located within the duct, and a compressor located within the duct.

A primary feature of the present invention is the exothermic decomposition of a starting gas such as nitrous oxide to form a molecular first gas such as nitrogen capable of having energy levels populated by thermal excitation. An ignitor, such as an electric arc, located within the housing is capable of initiating decomposition of the starting gas. The heat released in the exothermic reaction of the decomposition is sufficient to maintain the decomposition process and to raise the temperature of the first gas to a stagnation temperature of at least 1400° K. At this temperature the molecular vibration energy levels of the first gas are highly populated. As the first gas flows through the nozzle, the fraction of molecules in vibration energy levels is maintained and a high nonequilibrium population density is formed. A relatively cool second gas, such as carbon dioxide, or nitrous oxide, having an upper energy level nearly resonant with the upper energy level of the first gas and having a lower energy level is injected into the laser, typically downstream the nozzle, and mixes with the first gas to produce a population inversion between the vibration energy levels of the second gas. The chamber located downstream the nozzle includes optical means capable of extracting power from the second gas as it flows through the chamber. Additionally, means are provided for injecting a third gas having energy levels nearly resonant with the lower energy levels of the second gas and capable of depopulating the lower energy level of the second gas to enhance the population inversion thereof. A feature of one embodiment of the present invention is a diffuser located downstream the chamber. A decomposition chamber located downstream the diffuser is capable of maintaining the high stagnation temperature of the second gas as it passes through the diffuser to allow the thermal decomposition of the second gas to form the first gas. A duct connected at one end to the decomposition chamber and at the other end to the housing provides a passage for recycling the first gas into the housing. Gas bleed means located within the duct are capable of maintaining gas flow weights within the system to compensate for the continuous addition of second gas. The heat exchanger is capable of cooling the recycling gases to allow the compressor to raise the temperature and pressure of the recycling gas sufficient to compensate for pressure losses within the system and to produce a stagnation temperature in the housing of at least 1400° K.

An advantage of the present invention is the improved efficiency of converting thermal energy into laser energy. Additionally, the exothermic thermal decomposition of the starting gas into its constituent parts, eliminates the requirements of a separate source of energy to heat the first gas. The compressor located within the return duct is capable of increasing the temperature of the recycling first gas to the maximum allowed by compressor material and cooling techniques, thereby increasing the specific power of a laser. The gases injected into the laser are storable, cheap and nontoxic. Additionally, an embodiment of the present invention requires the insertion of only a single gas such as nitrous oxide into a gas dynamic mixing laser. A recirculating first gas such as nitrogen is formed as one of the decomposition products of the single gas.

The foregoing and other objects, features and advantages of the present invention will become more apparent in the light of the following detailed description of the preferred embodiments thereof as discussed and illustrated in the accompanying drawing.

DESCRIPTION OF THE PREFERRED EMBODIMENT

Figure 1:
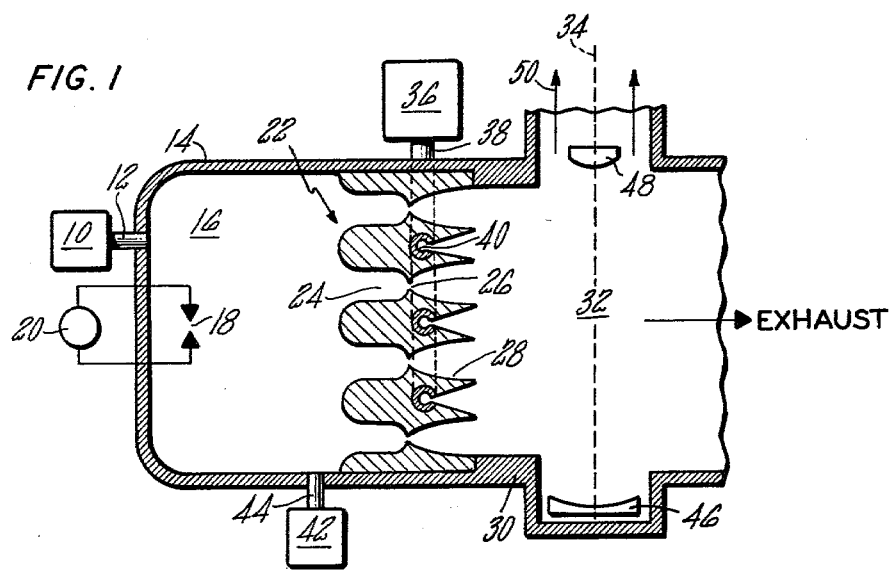
FIG. 1 is a simplified cross-sectional view of a gas dynamic mixing laser illustrating a simple embodiment of the present invention.

An illustrative embodiment of the invention as shown in FIG. 1 includes a source of starting gas 10, such as nitrous oxide, capable of forming a first gas, such as nitrogen, connected by a connecting pipe 12 to a housing 14 having a reaction chamber 16. An ignitor 18 located within the reaction chamber has an energizing source 20. A supersonic nozzle array 22 connected at one end to the housing has a plurality of individual nozzles each with a converging section 24, a throat section 26, and an expansion section 28. A chamber 30, connected to the other end of the nozzle array, has an optical cavity 32 with a longitudinal optical axis 34 transverse to the flow path of the gases. A source of second gas 36 such as carbon dioxide or nitrous oxide is connected by a distribution duct 38 to a plurality of orifices 40 within the nozzle array. A source of third gas 42, such as water vapor, is connected to the reaction chamber 16 by a connector 44. Alternatively, the third gas can be introduced directly into the distribution duct 38.

The optical cavity 32 may be formed in accordance with well known techniques for extracting energy from an inverted population of the energy levels of a lasing gas and as shown in FIG. 1 is defined by an unstable oscillator having a concave mirror 46 at one end and a convex mirror 48 at the other end with each mirror centrally positioned on the optical axis 34 and is capable of providing a laser output beam 50 having an annular shape with an outer diameter equal to the diameter of the concave mirror and an inner diameter equal to the diameter of the convex mirror. Alternative means for extracting powers from the lasing gas could be in the form of a multiple-pass oscillator configuration or of an oscillator-amplifier configuration.

Figure 2:
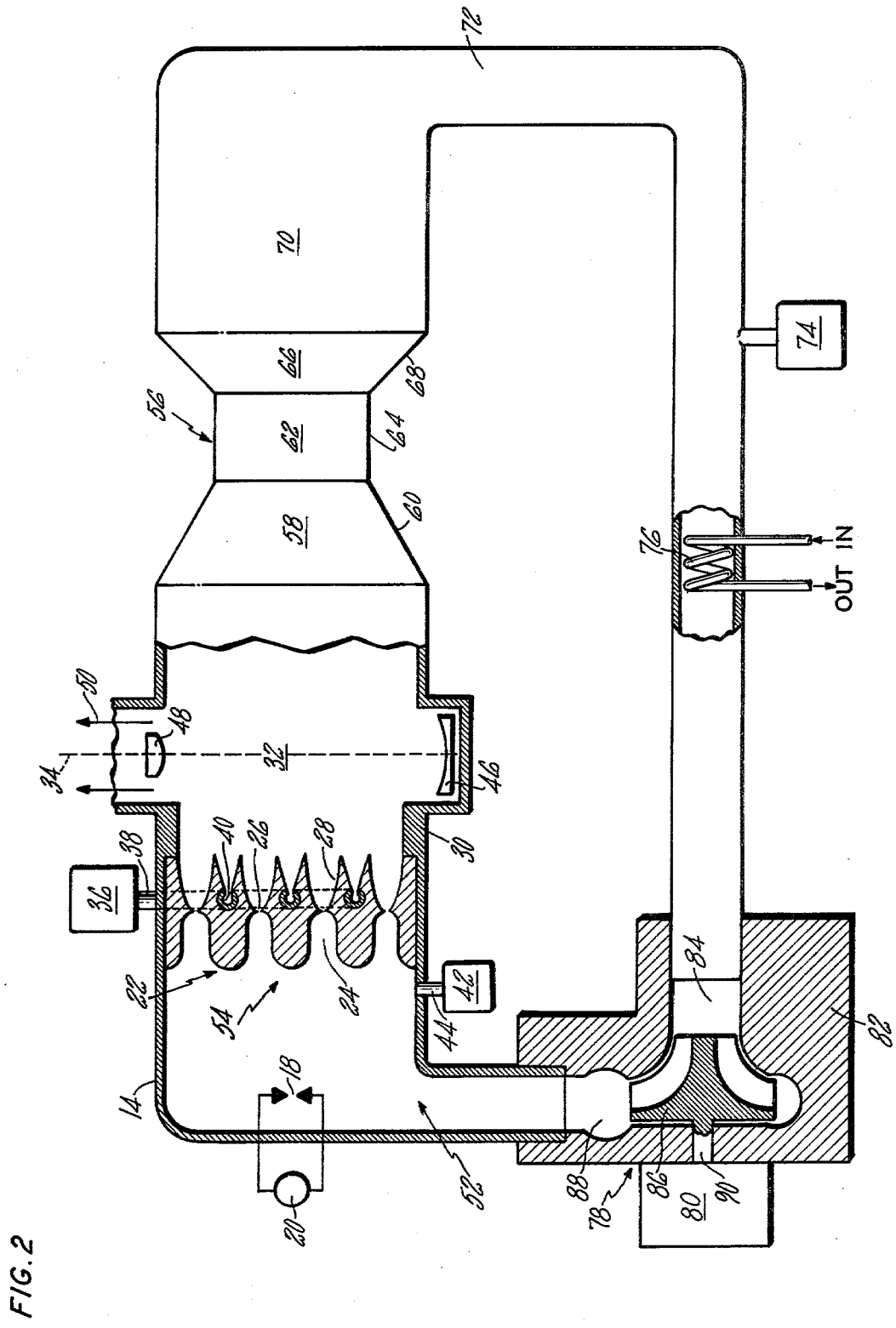
FIG. 2 is a simplified cross-sectional view of a closed cycle embodiment of the present invention.

FIG. 2 shows an embodiment of the present invention wherein similar elements as shown in FIG. 1 have been given the same reference numerals. The housing 14 has an entrance 52 and an exit 54 connected to the nozzle array 22. The chamber 30 having the optical cavity 32 is located downstream the nozzle array. Both the nozzle array and chamber have elements identical to the elements shown in FIG. 1. Attached to the downstream side of the chamber 30 is a supersonic diffuser 56 having a converging region 58 defined by walls 60, a throat region 62 having throat walls 64, and an expansion region 66 having expansion walls 68. A decomposition chamber 70 is attached at one end to the expansion walls 68 and at the other end to a duct 72. Located with the duct is a bleed means 74, a heat exchanger 76, and a compressor 78. The compressor has drive means 80, a compressor housing 82, an inlet 84, an impeller 86 mounted for rotation within the housing, and an outlet 88 for attachment to the entrance 52 of the housing 14. A shaft 90 is connected to the impeller at one end and extends to the exterior of the housing. Drive means 80 cooperates with the shaft to drive the impeller. Ignitor 18 is located within the housing to initiate the decomposition process.

The drive means 80 may be powered by any convenient source of shaft power such as a gas turbine or an expansion turbine. Also, systems which utilize the waste heat of the cycle and diffuser bleed means may be used to improve the overall cycle performance as disclosed in U.S. Pat. Nos. 3,984,784 and 3,886,475.

Figure 3:
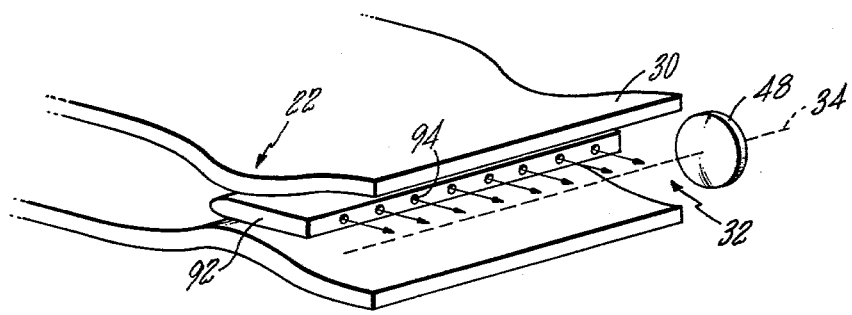
FIGS. 3-4 are simplified schematic diagrams of mixing nozzles which may be incorporated into the present invention.
Figure 4:
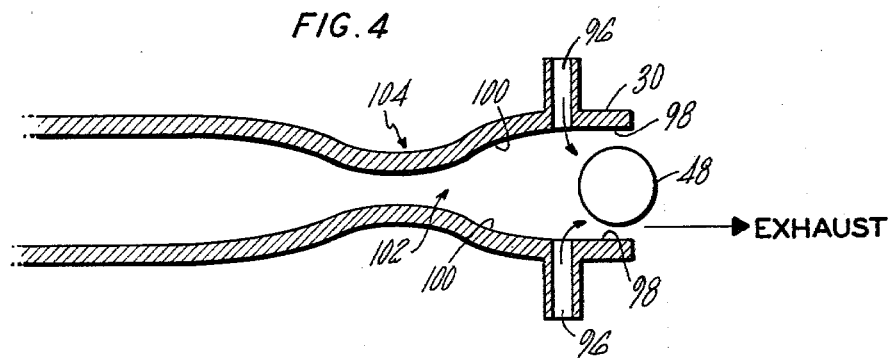

The invention is not dependent upon the particular configuration of the supersonic nozzle or the means for passing the second gas into the chamber to obtain an admixture of the second and first gas. Alternate means for admixing the gases are shown in FIGS. 3 and 4. In FIG. 3 a single injector element 92 within a single nozzle has a plurality of orifices 94 for passing the second gas into the chamber to mix with the stream of first gas. The injector is capable of ducting the second gas completely across the optical cavity 32 in a direction essentially parallel to the optical axis 34, and the second gas passes directly into the optical cavity through the plurality of orifices.

In FIG. 4 a plurality of ports 96 located in walls 98 of the chamber 30 are capable of passing second gas directly into the path of the first gas in a direction essentially perpendicular to the path of the first gas. Alternatively, the ports 96 can be located in nozzle walls 100 in an expansion section 102 of a nozzle 104 for mixing the second and first gas prior to passing the mixture into the chamber.

The present invention is a gas dynamic mixing laser which employs a gas capable of exothermic thermal decomposition in which the first gas is one of the species of the decomposition. For those exothermic reactions in which the energy release is sufficiently high, the molecules of the first gas will be thermally excited to a high excitation energy level. Expansion and cooling through a supersonic nozzle array will create an appropriate nonequilibrium population distribution of the energy levels provided that the remaining species of the exothermic thermal decomposition process do not de-excite the upper energy levels of the first gas. This condition will generally be obtained if the energy levels of the remaining species are not in close correspondence with the energy levels of the first gas.

Nitrous oxide is a substance which satisfies the foregoing criteria. A self-sustaining exothermic reaction can be produced in nitrous oxide which will release sufficient energy to heat the species of decomposition, i.e., nitrogen and oxygen, to a stagnation temperature of at least 1400° K. Under these conditions, the molecular vibration levels of nitrogen are highly populated. The energy level of nitrogen and oxygen are sufficiently different so that upon expansion of this mixture through a short supersonic nozzle, the nitrogen molecules will remain vibrationally excited and the fraction of nitrogen particles excited as they flow through the nozzle will be essentially unaffected by the presence of the oxygen molecules.

Referring again to FIG. 1. In operation a starting gas capable of being decomposed, such as nitrous oxide, is injected into the reaction chamber 16 through the connecting pipe 12. Ignitor 18 initially heats the starting gas to a temperature at which decomposition takes place, producing a high temperature, high pressure gas mixture of the species of decomposition such as nitrogen and oxygen. After the decomposition process begins, the exothermic reaction has a sufficiently high release of energy to maintain the decomposition process and to thermally excite the species of decomposition to provide nitrogen gas having a large population density in vibrationally excited energy levels. When nitrous oxide, at ambient temperature, is utilized as the starting gas, the species of decomposition, i.e., nitrogen and oxygen gas, are at a stagnation temperature of at least 1400° K. The ignitor 18 provides the energy necessary to initiate the decomposition process and to sustain it during the early part of the start transcient.

The degree of vibration excitation of the nitrogen gas in the reaction chamber 16 is governed solely by the stagnation temperature, since the gas is in thermodynamic equilibrium. As the nitrogen gas undergoes the gas dynamic expansion process in the supersonic nozzle array 22, the static temperature of the gas is significantly reduced. However, molecules of nitrogen gas in vibrationally excited levels have a relatively long lifetime and the relative population densities of these excited levels remain relatively unchanged as the gas passes through the supersonic nozzle array in what is an essentially nonequilibrium expansion process.

A second gas such as carbon dioxide or nitrous oxide is passed into the chamber through individual nozzle elements 40 via the distribution duct 38. Adjacent streams of first gas and second gas are comingled and mixed in the expansion region 28 prior to entrance into the optical cavity 32. At the nozzle exit plane, the population density of the vibration energy levels of the first gas is higher than what would be given by the static temperature of the supersonic flow at this point. The vibrational energy of the first gas is efficiently transferred to the second gas by collisional de-excitation producing a population inversion of energy levels within the second gas. A third gas, such as water vapor, injected through a connector 44 mixes with the second gas and is capable of collisional de-excitation of the population density of the lower energy level of the second gas whereby the population inversion of the energy levels of the second gas is increased.

As the gas flows through the optical cavity, optical power is extracted from the second gas as a laser beam 50 having an annular cross section. The optical power extraction mechanism as shown in FIG. 1 is that of an unstable oscillator and is a well known technique for extracting laser energy from an inverted population distribution. In operation, the laser beam is passed into the atmosphere through a window which is transparent to the appropriate wavelength of laser radiation. For high power applications it may be necessary to use an aerodynamic window to allow the beam to pass from the relatively low pressure region of the cavity into the atmosphere.

The admixture of gases may be exhausted from the chamber into the atmosphere via a supersonic diffuser if the pressure and Mach number are sufficiently high to permit this action. The gases may also be discharged into a low pressure exhaust system.

In operation of an embodiment of the present invention as shown in FIG. 2, the first gas and the third gas, if any, are recycled into the housing 14 for reuse within the laser. The second gas for use in this embodiment is capable of being decomposed to produce the first gas as one of the species of decomposition. Nitrous oxide is a second gas having this capability. Initially, a second gas, such as nitrous oxide, is passed into the laser through the orifices 40 and flows through the duct 72 to the housing 14. Ignitor 18 within the housing is capable of providing the initial decomposition of the second gas to provide a first gas having a high temperature through the nozzle. The first gas mixes with the second gas and laser power is extracted in the optical cavity 32 as hereinbefore discussed. The gas mixture flows through the diffuser 56 which converts the kinetic energy of the gas mixture to produce a stagnation temperature of the mixture of at least 1400° K. in the decomposition chamber 70 where the second gas decomposes into its species of decomposition such as nitrogen and oxygen via an exothermic thermal decomposition process. The species then flow into the duct 72 where a portion of the mixture now consisting essentially of nitrogen, and oxygen is bled to the atmosphere through bleed means 74 in an amount equal to the weight of nitrous oxide passed into the laser during operation. The bleed means is necessary to maintain an essentially constant weight flow of gas in the laser system during operation. If a third gas for suppressing the lower energy level of the second gas is introduced into the system the amount of gases bled to the atmosphere must be increased accordingly.

The mixture of gases within the duct are cooled through the heat exchanger 76 and pass into the compressor where the temperature of the mixture is raised to a stagnation temperature of at least 1400° K. and passed into the housing and the cycle is repeated. The temperature is as high as possible consistent with compressor temperature limitations.

Although this invention has been shown and described with respect to a preferred embodiment thereof, it should be understood by those skilled in the art that various changes and omissions in the form and detail thereof may be made therein without departing from the spirit and scope of the invention.

Having thus described preferred embodiments of my invention that which I claim as new and desire to secure by Letters Patent of the United States is:

1. A laser system comprising:
    a housing having an entrance and an exit;
    a nozzle connected to the exit of the housing to expand a first gas to supersonic velocity;
    containment means for a second gas having an upper energy level and a lower energy level;
    a chamber, including optical means for stimulating emission of radiation, located downstream the nozzle;
    means attached between the optical means and the housing for passing the second gas into the chamber to form an admixture with the expanded first gas whereby the upper energy level of the second gas is capable of being populated by collisional energy exchange with a vibrational energy level of the first gas;
    means located downstream the chamber for producing a stagnation temperature sufficiently high to thermally decompose the second gas to form the first gas;
    a duct connected at one end to the means for producing a high stagnation temperature and at the other end to the entrance of the housing to provide a passage for recycling the first gas;
    bleed means within the duct for removing a portion of the gases to compensate for the continuous addition of second gas;
    a heat exchanger located within the return duct; and
    a compressor located within the return duct downstream the heat exchanger to compress the first gas to a high stagnation temperature and pressure.

2. The invention according to claim 1 wherein the second gas is nitrous oxide.

3. The invention according to claim 2 wherein the first gas is nitrogen.

4. The invention according to claim 1 further including:
    containment means for a third gas having an energy level nearly resonant with the lower energy level of the second gas; and
    means for passing the third gas into the chamber to form an admixture with the first and second gas whereby the lower energy level of the second gas is capable of being depopulated by collisional energy exchange with the energy level of the third gas.

5. The invention according to claim 1 further including:
    means for initiating decomposition of the second gas within the housing.

6. The invention according to claim 1 wherein the stagnation temperature is at least 1400° K.

* * * * *